Figure 1:
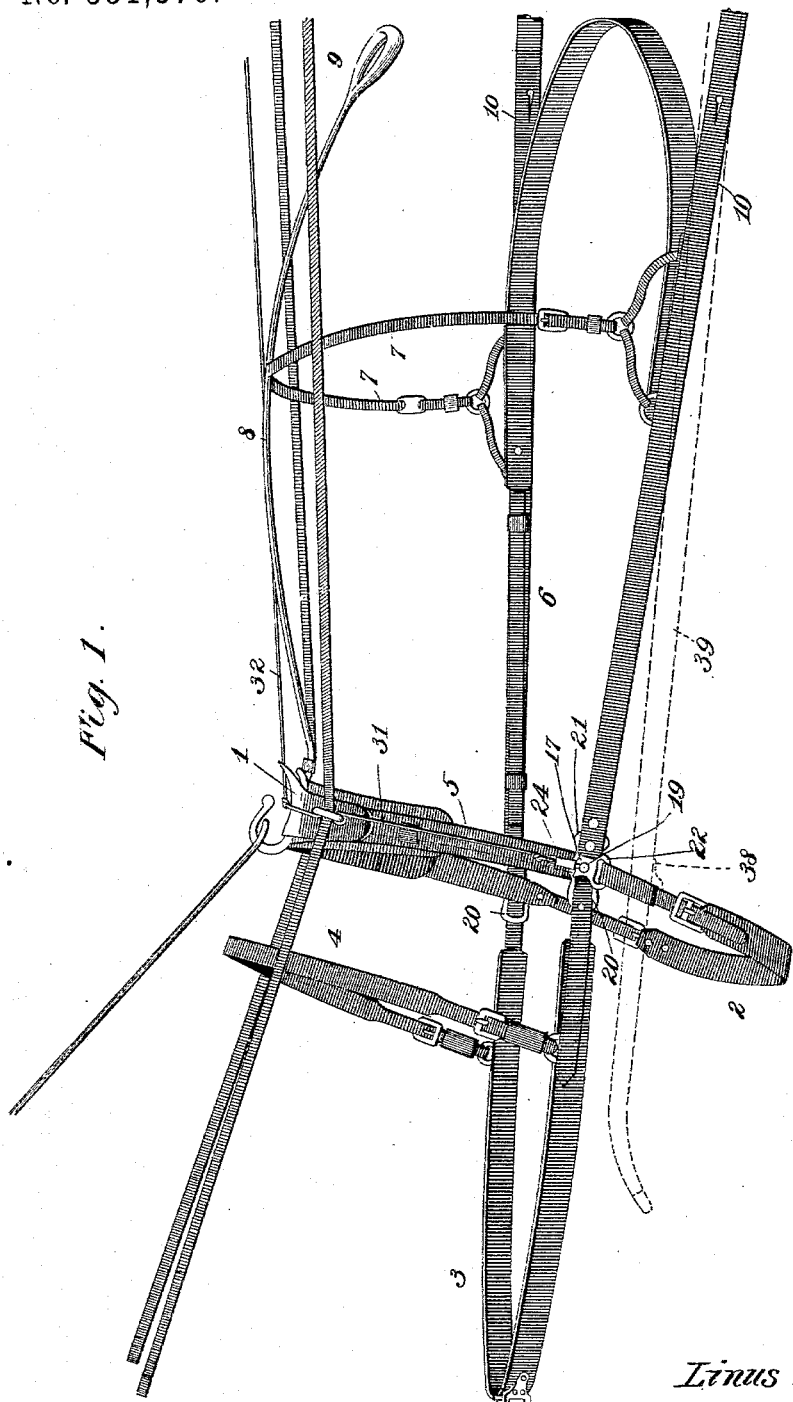

(No Model.) 2 Sheets—Sheet 1.

L. T. GRUBBS.
HARNESS.

No. 551,376. Patented Dec. 17, 1895.

Witnesses
Harold H. Simms
V. B. Hillyard

Inventor
Linus T. Grubbs.
By his Attorneys.
C. A. Snow & Co.

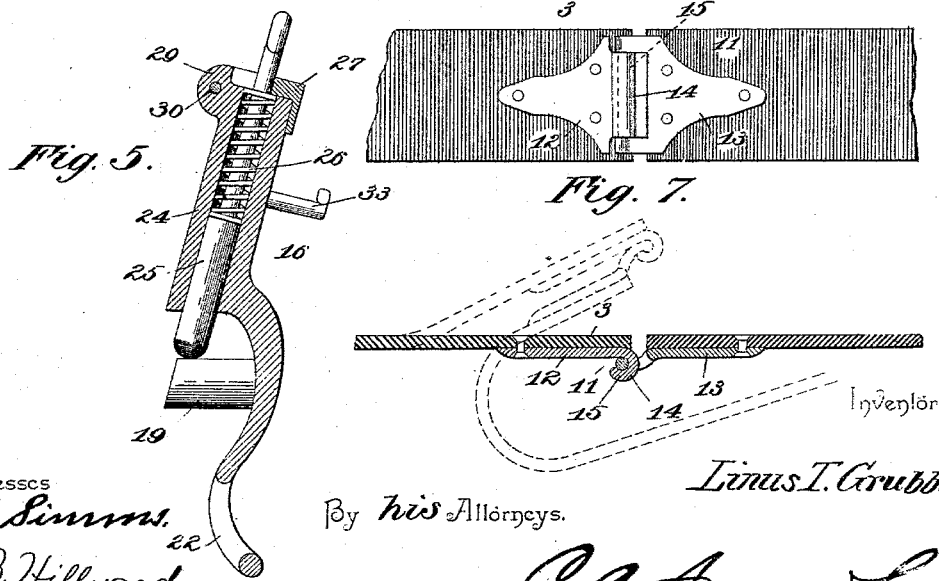

United States Patent Office.

LINUS T. GRUBBS, OF ARCANUM, OHIO.

HARNESS.

SPECIFICATION forming part of Letters Patent No. 551,376, dated December 17, 1895.

Application filed June 29, 1895. Serial No. 554,490. (No model.)

*To all whom it may concern:*

Be it known that I, LINUS T. GRUBBS, a citizen of the United States, residing at Arcanum, in the county of Darke and State of Ohio, have invented a new and useful Harness, of which the following is a specification.

This invention relates to certain new and useful improvements in harness, and aims to facilitate the harnessing and unharnessing of the horse and render these operations possible without removing the halter or tether, and at the same time provide for the ready detachment of the horse from the vehicle in the event of the horse becoming fractious and unmanageable and when danger is imminent because of the inability of the driver to bring the animal into subjection.

With these and other objects in view, which will appear from the following description, the improvement consists of the novel features and the peculiar construction and combination of the parts which hereinafter will be more fully set forth and claimed, and which are illustrated in the accompanying drawings, in which—

Figure 1 is a perspective view showing the application of the invention. Fig. 2 is a front elevation on a larger scale of a horse-detaching contrivance. Fig. 3 is a perspective view of the horse-detacher disassociated from the harness. Fig. 4 is a rear elevation of the iron co-operating with the horse-detaching buckle and to which the shaft-carrier and tug are attached. Fig. 5 is a vertical section of the horse-detacher on the line X X of Fig. 2. Fig. 6 is a detail view of the collar-fastener. Fig. 7 is a detail section of the collar-fastener, showing the manner of uncoupling the parts by the dotted lines.

The harness, which may be of usual construction, comprises the saddle 1, girth 2, breast-strap or collar 3, neck-strap 4, breeching 5, holdbacks 6, hip-straps 7, back-strap 8, terminating in the crupper 9, and the tugs or traces 10.

The breast-strap or collar is centrally divided and is connected by means of a fastening or coupling 11 comprising similar parts 12 and 13 which are attached, respectively, to the adjacent ends of the separated parts.

The parts of the coupling are readily separable, thereby facilitating the harnessing and unharnessing of the animal without necessitating the loosening or removal of the halter when the animal is tethered. The part 12 has a slotted sleeve or hooked extension 14, and the part 13 has a loop, the cross-bar 15 of which is adapted to engage with the slotted sleeve or hook 14 when the parts of the coupling are assembled, and this cross-bar 15 is reduced at its lower end, so as to pass freely through the slot of the sleeve 14 when coupling or uncoupling the fastening.

When it is required to connect or disconnect the coupling its component parts must be brought together about as shown in the dotted lines in Fig. 7, when the desired result can be attained by sliding the parts the one upon the other, so as to move the cross-bar within the slotted sleeve 14. When the fastening is coupled and its parts aligned the slotted sleeve will occur between the side portions of the loop at the end of the part 13, thereby preventing the accidental disengagement of the parts.

The horse-detacher, which is applied at the juncture of the holdback, breast-strap, girth and saddle-strap, comprises a buckle-frame 16 and an iron 17, the latter having an inclined or oblique eye 18 to receive a corresponding stud 19 of the buckle-frame. The buckle-frame has front and rear loops 20 and 21, respectively, a lower loop 22, which curves inwardly, a rear projection 23, and a tubular casing 24, the latter being located at the top edge of the frame and inclosing a latch-bolt 25, which co-operates with the stud 19 and retains the iron 17 in engagement therewith. A spiral spring 26 is mounted upon the latch-bolt 25, and is confined between a shoulder thereof and a collar 27 fitted to the upper end of the tubular casing 24, and this spring serves to hold the latch-bolt projected across the space formed between the lower end of the tubular casing 24 and the said stud 19. The collar 27 is removably fitted upon the casing 24, and has a pair of outwardly-extending ears 28, between which is received a corresponding ear 29 extending outwardly from the tubular casing 24, and a pin 30 passes through registering openings in the three ears and holds the collar in place. When it is required to gain access to the tubular casing for cleaning, repairing, or any other purpose, the pin 30 is removed, when the collar can be detached and the latch-bolt with its actuating-spring can be withdrawn from the casing. A cord or like connection 31 is attached to the latch-bolt by being passed through the eye at the upper end thereof, and this cord is attached at its extremities to the latch-bolt of the horse-detachers at opposite sides of the harness and is passed through the rings of the saddle, and an operating-cord 32 has connection therewith and extends within convenient reach of the driver in the buggy or vehicle, so as to be pulled upon when it is required to liberate the animal in an emergency.

A T projection 33 is formed on the rear side of the tubular casing 24 and the saddle-strap is connected therewith, the extremity of the said strap being passed through the lower loop 22. The breast-strap is passed through the front loop 20, engaged with the rear projection 23, and has its end portion passed between the buckle-frame and the end portion of the saddle-strap. The holdback has connection with the rear loop 21.

The iron 17 has a lower loop 34, a shank 35, and a front projection 36, which is adapted to engage with the lower end of the tubular casing 24 and limit the downward movement of the shank 35, the upward movement of the latter being limited by the said shank engaging with the lower end of the tubular casing 24 in precisely the same manner as the projection 36. The tug or trace is riveted or otherwise secured to the shank 35, and the shaft-carrier 37 is suspended from the loop 34. The eye or opening 18 inclines in an upward direction from the outer face of the iron, so as to enable the ready detachment of the iron from the stud 19 after the latch-bolt has been withdrawn, and that portion of the iron above the eye is beveled to enable the snapping of the iron upon the stud 19 without the necessity of the hostler withdrawing the latch for the purpose of enabling the iron to be properly positioned and engaged with the stud 19. To further facilitate the snapping or engagement of the iron with the buckle the lower end of the latch-bolt is convexed or made rounding.

Stops 38 are provided upon the thills 39 and are intended to receive the stress upon the holdbacks when it is required to back the vehicle or prevent the same from crowding upon the horse when descending a grade.

The tugs and shaft-carriers remain in engagement with the thills or shafts of the vehicle, whereas the remaining parts of the harness are fitted upon the animal, and in the event of it becoming necessary to withdraw the latch-bolts the horse will move forward and leave the vehicle, carrying that part of the harness fitted to him, whereas the traces and the shaft-carriers will remain affixed to the vehicle.

The invention is susceptible of application to any make or style of harness, and in adapting the same to a particular pattern or stye it is to be understood that various changes in the form, proportion, and the minor details of construction may be resorted to without departing from the principle or sacrificing any of the advantages of this invention.

Having thus described the invention, what is claimed as new is—

1. A horse detacher for harness, comprising a buckle frame having an outwardly and downwardly inclined stud, and having a spring-actuated locking bolt operating in a casing located directly above the said stud, and an iron having an eye to receive the said inclined stud and provided with a front projection and a rearwardly-extending shank in horizontal alignment and adapted to engage with the lower end of the casing in which operates the aforementioned spring-actuated locking bolt, substantially as set forth for the purpose described.

2. In a horse detacher for harness, the combination with a buckle frame having an outwardly and downwardly inclined stud, a loop below the stud, a tubular casing above the stud and provided with a spring-actuated locking bolt, and a T projection on the rear side of the tubular casing, of an iron having an upwardly-inclined eye and beveled on its top side, and formed with a pendent loop, a front projection and a rearwardly-extending shank, substantially as and for the purpose set forth.

3. In a horse detacher for harness, the combination with a buckle frame having a tubular casing and an inclined stud, of a spring-actuated bolt operating within the casing, a collar removably fitted to the upper end of the said casing and having outwardly-extending ears between which is fitted a corresponding ear on the casing, a pin passing through registering openings in the said ears, and an iron having an eye to receive the said stud and retain in engagement therewith by the said spring-actuated bolt, substantially as set forth.

4. A horse detacher comprising a buckle having loops extending from its front, rear and lower edges, and having an inclined stud and a tubular casing, the latter formed with an ear and a T projection, and the said buckle having a rear projection, a spring-actuated locking bolt located within the tubular casing, a collar having ears to embrace the ear on the casing and removably held thereto by means of a pin passing through openings in the said ears, and an iron having an oblique eye to receive the said stud, and formed with a pendent loop, a rearwardly-extending shank and a front projection, substantially as set forth for the purpose described.

In testimony that I claim the foregoing as my own I have hereto affixed my signature in the presence of two witnesses.

LINUS T. GRUBBS.

Witnesses:
J. W. MAYS,
J. M. CHANCELLOR.